(12) United States Patent
Asterjadhi et al.

(10) Patent No.: US 9,743,275 B2
(45) Date of Patent: Aug. 22, 2017

(54) MULTIPLE BSSID PROCEDURE WITH TIM ENCODING

(71) Applicant: QUALCOMM Incorporated, San Diego, CA (US)

(72) Inventors: Alfred Asterjadhi, San Diego, CA (US); Amin Jafarian, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 14/673,589

(22) Filed: Mar. 30, 2015

(65) Prior Publication Data

US 2015/0312753 A1    Oct. 29, 2015

Related U.S. Application Data

(60) Provisional application No. 61/986,055, filed on Apr. 29, 2014.

(51) Int. Cl.
| | | |
|---|---|---|
| *H04W 8/26* | (2009.01) | |
| *H04W 4/06* | (2009.01) | |
| *H04W 74/00* | (2009.01) | |
| *H04W 4/00* | (2009.01) | |
| *H04W 28/02* | (2009.01) | |
| *H04W 72/00* | (2009.01) | |

(52) U.S. Cl.
CPC .............. *H04W 8/26* (2013.01); *H04W 4/00* (2013.01); *H04W 4/06* (2013.01); *H04W 28/02* (2013.01); *H04W 74/006* (2013.01); *H04W 72/005* (2013.01)

(58) Field of Classification Search
None
See application file for complete search history.

(56) References Cited

U.S. PATENT DOCUMENTS

| | | | | |
|---|---|---|---|---|
| 2009/0016306 A1* | 1/2009 | Wang | .................. | H04W 74/006 370/338 |
| 2013/0142184 A1* | 6/2013 | Wang | .................... | H04L 5/0053 370/338 |
| 2013/0336245 A1* | 12/2013 | Fischer | .................. | H04W 88/10 370/329 |

(Continued)

FOREIGN PATENT DOCUMENTS

WO    WO-2013070175 A1    5/2013

OTHER PUBLICATIONS

International Search Report and Written Opinion—PCT/US2015/023501—ISA/EPO—Jul. 23, 2015.

*Primary Examiner* — Donald Mills
(74) *Attorney, Agent, or Firm* — Patterson & Sheridan, LLP

(57) ABSTRACT

Certain aspects of the present disclosure provide methods and apparatus for s wireless communications, comprising a processing system configured to generate a frame with an information element (IE) having a partial virtual bitmap field that indicates zero or more basic service sets (BSSs) that have buffered group-cast traffic, wherein the partial virtual bitmap field comprises at least one encoded subfield that identities at least one individual BSS having buffered group-cast traffic using one or more bits of an identifier of the individual BSS, and an interface for outputting the frame containing the IE for transmission.

20 Claims, 10 Drawing Sheets

(56) References Cited

U.S. PATENT DOCUMENTS

| | | | |
|---|---|---|---|
| 2014/0010152 A1* | 1/2014 | Park | H04W 28/065 370/328 |
| 2014/0071900 A1* | 3/2014 | Park | H04W 74/04 370/329 |
| 2014/0146678 A1* | 5/2014 | Merlin | H04L 47/12 370/235 |
| 2014/0269317 A1* | 9/2014 | Wang | H04L 69/04 370/235 |
| 2014/0334368 A1* | 11/2014 | Zhou | H04W 4/08 370/311 |
| 2015/0085780 A1* | 3/2015 | Kim | H04W 52/0216 370/329 |

* cited by examiner

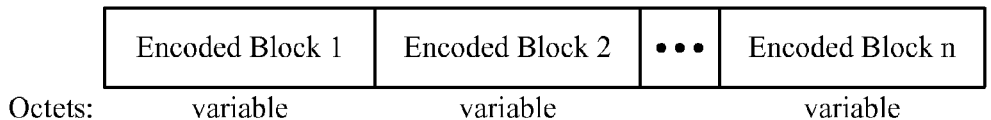
FIG. 6A
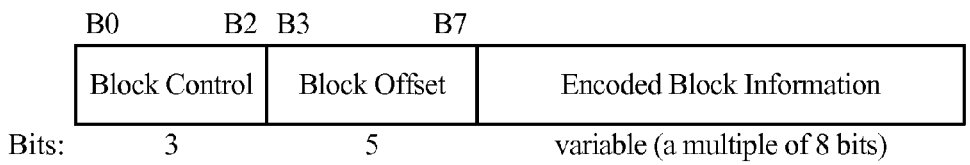
FIG. 6B
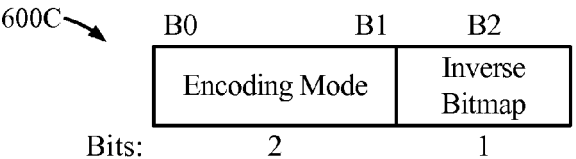
FIG. 6C
| Bit 2 | Bit 1 | Bit 0 | Encoding mode |
|---|---|---|---|
| 0 | 0 | 0 | Block Bitmap |
| 0 | 0 | 1 | Single AID |
| 0 | 1 | 0 | OLB |
| 0 | 1 | 1 | ADE |
| 1 | 0 | 0 | Inverse Bitmap + Block Bitmap |
| 1 | 0 | 1 | Inverse Bitmap + Single AID |
| 1 | 1 | 0 | Inverse Bitmap + OLB |
| 1 | 1 | 1 | Inverse Bitmap + ADE |
FIG. 6D

1000

| B0 | | B5 | B6 | | B7 |
|---|---|---|---|---|---|
| Single AID | | | BSS Indicator | Reserved | |

Bits:       6              1           1

Encoded Block Information (Single AID mode)

FIG. 10

MULTIPLE BSSID PROCEDURE WITH TIM ENCODING

CLAIM OF PRIORITY UNDER 35 U.S.C. §119

The present Application for Patent claims benefit of U.S. Provisional Patent Application Ser. No. 61/986,055, filed Apr. 29, 2014 and assigned to the assignee hereof and hereby expressly incorporated by reference herein.

BACKGROUND

Field of the Invention

Certain aspects of the present disclosure generally relate to wireless communications and, more particularly, to multiple BSSID with TIM encoding.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system configured to generate a frame with an information element (IE) having a partial virtual bitmap field that indicates one or more basic service sets (BSSs) that have buffered group-cast traffic, wherein the partial virtual bitmap field comprises at least one encoded subfield that identifies at least one individual BSS having buffered group-cast traffic using one or more bits of an association identification or assigned identification (AID) of the individual BSS and an interface for outputting a frame containing the IE for transmission.

Certain aspects of the present disclosure provide an apparatus for wireless communications. The apparatus typically includes an interface for receiving a frame containing an information element (IE) and a processing system configured to determine the presence of buffered group-cast traffic for the apparatus based on a partial virtual bitmap field in the IE, that indicates one or more basic service sets (BSSs) that have buffered group-cast traffic, wherein the bitmap field comprises at least one encoded subfield that identifies at least one individual BSS having buffered group-cast traffic using one or more bits of an association identification or assigned identification (AID) of the individual BSS.

Certain aspects of the present disclosure provide a method for wireless communications by an apparatus. The method typically includes generating, at an apparatus, a frame with an information element (IE) having a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, and outputting the frame containing the IE for transmission.

Certain aspects of the present disclosure provide a method for wireless communications by an apparatus. The method typically includes receiving, at an apparatus, a frame containing an information element (IE), wherein the IE comprises a partial virtual bitmap field that indicates zero or more basic service sets (BSSs) that have buffered group-cast traffic and at least one encoded subfield that identifies at least one individual BSS having buffered group-cast traffic using one or more bits of an identifier of the individual BSS, and determining the presence of buffered group-cast traffic for the apparatus based on the partial virtual bitmap and to decide whether or not to change at least one power state to receive the buffered group-cast traffic, based on the determination.

Certain aspects of the present disclosure provide an apparatus for wireless communications. The apparatus typically includes means for generating a frame with an information element (IE) having a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, and means for outputting the frame containing the IE for transmission.

Certain aspects of the present disclosure provide an apparatus for wireless communications. The apparatus typically includes means for receiving a frame containing an information element (IE) wherein the IE comprises a partial virtual bitmap field that indicates zero or more basic service sets (BSSs) that have buffered group-cast traffic and at least one encoded subfield that identifies at least one individual BSS having buffered group-cast traffic using one or more bits of an identifier of the individual BSS and means for determining the presence of buffered group-cast traffic for the apparatus based on the partial virtual bitmap and to decide whether or not to change at least one power state to receive the buffered group-cast traffic, based on the determination.

Certain aspects of the present disclosure provide a computer program product for wireless communications. The computer program product typically comprises a computer-readable medium having instructions for generating a frame with an information element (IE) having a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, and outputting the frame containing the IE for transmission.

Certain aspects of the present disclosure provide a computer program product for wireless communications. The computer program product typically comprises a computer-readable medium having instructions for receiving, at an apparatus, a frame containing an information element (IE), wherein the IE comprises a partial virtual bitmap field that indicates zero or more basic service sets (BSSs) that have buffered group-cast traffic and at least one encoded subfield that identifies at least one individual BSS having buffered group-cast traffic using one or more bits of an identifier of the individual BSS and determining the presence of buffered group-cast traffic for the apparatus based on the partial virtual bitmap and to decide whether or not to change at least one power state to receive the buffered group-cast traffic, based on the determination.

Certain aspects of the present disclosure provide an access point. The access point typically includes at least one antenna, a processing system configured to generate a frame with an information element (IE) having a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, and a transmitter configured to transmit, via the at least one antenna, the frame containing the IE for transmission.

Certain aspects of the present disclosure provide an access point. The access point typically includes at least one antenna, a receiver configured to receive, via the at least one antenna, a frame containing an information element (IE), wherein the IE comprises a partial virtual bitmap field that indicates zero or more basic service sets (BSSs) that have buffered group-cast traffic and at least one encoded subfield that identifies at least one individual BSS having buffered group-cast traffic using one or more bits of an identifier of the individual BSS, and a processing system configured to determine the presence of buffered group-cast traffic for the apparatus based on the partial virtual bitmap and to decide whether or not to change at least one power state to receive the buffered group-cast traffic, based on the determination.

Certain aspects also provide various methods, apparatuses, and computer program products capable of performing operations corresponding to those described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6A-6D illustrates example structures of a partial virtual bitmap for a block encoding mode, in accordance with certain aspects of the present disclosure.

FIG. 10 illustrates an example structure for an encoded block of a partial virtual bitmap, in accordance with aspects of the present disclosure.

DETAILED DESCRIPTION

Figure 1:
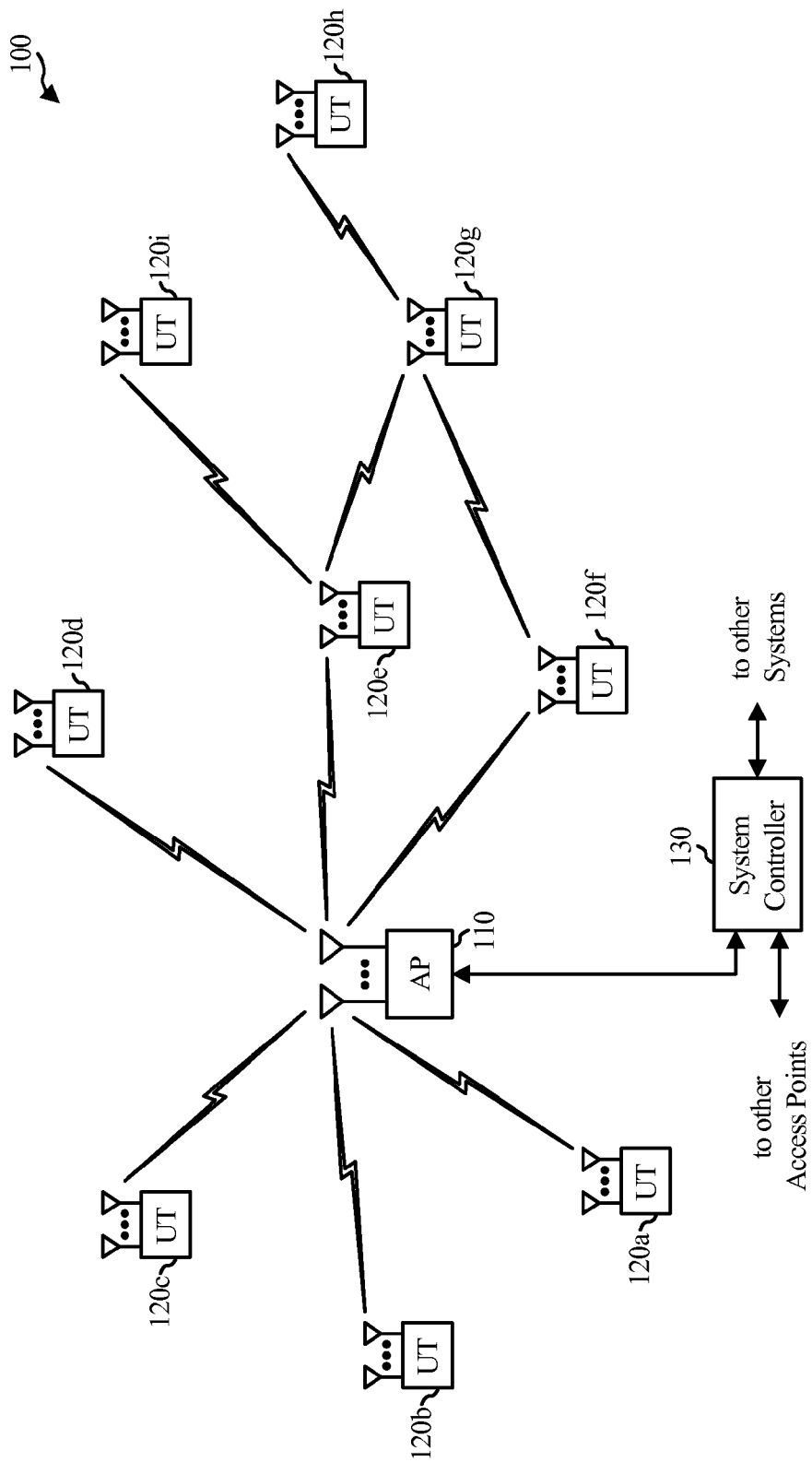
FIG. 1 illustrates a diagram of an example wireless communications network, in accordance with certain aspects of the present disclosure.

Aspects of the present disclosure provide enhancements to mechanisms involving certain selective transmission mechanisms, such as partial virtual bitmaps (PVB) and multiple basic service set IDs (BSSIDs). By providing an indication of multiple BSSID in a partial virtual bitmap (PVB) of a Traffic Indication Map (TIM) Information Element (IE), support for multiple BSS while using an association identification (AID) may be provided.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes or devices). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint, sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
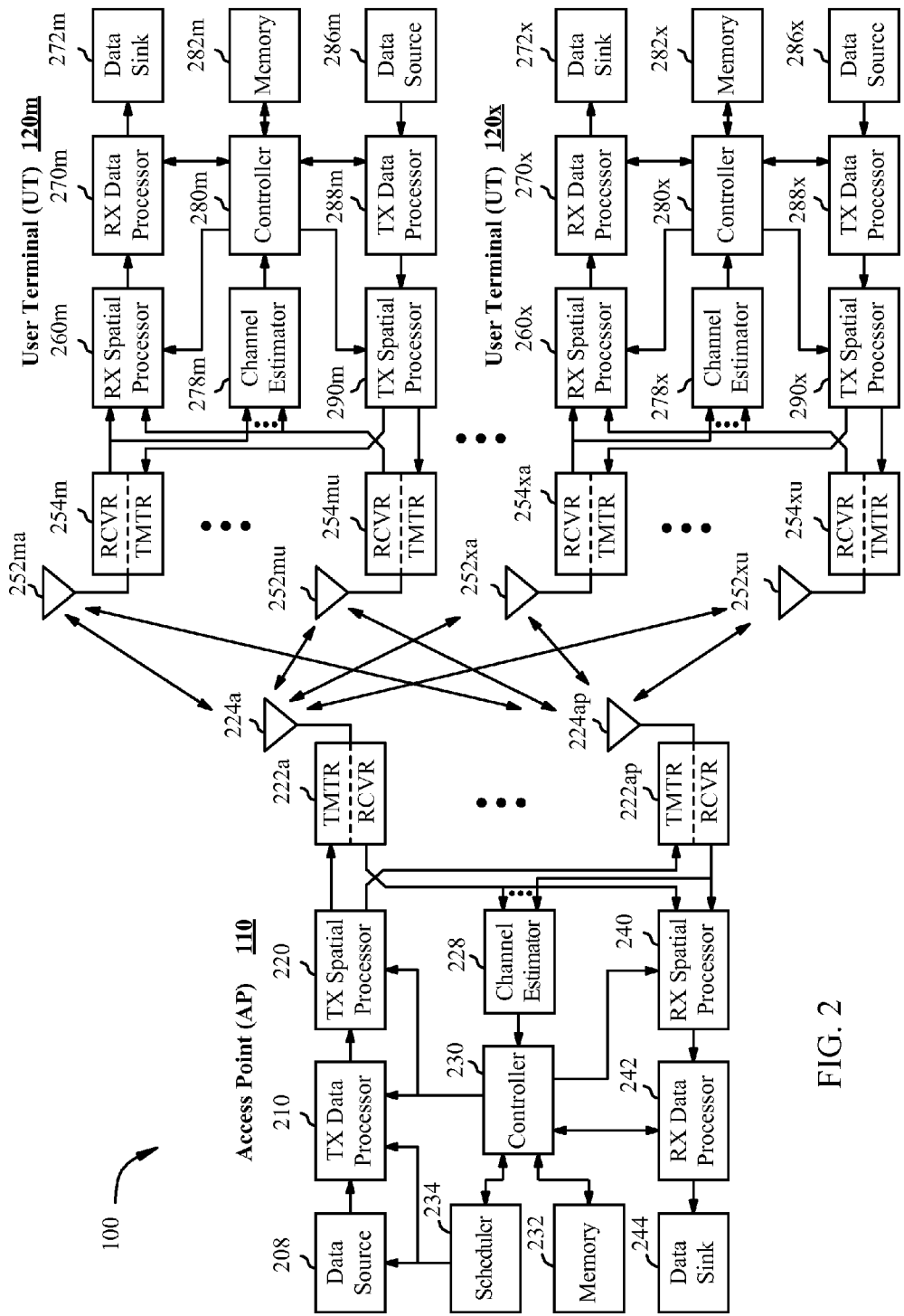
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{ap}$ recovered uplink data symbol streams. The receiver spatial processing is performed in accordance with the channel correlation matrix inversion (CCMI), minimum mean square error (MSSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates. SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
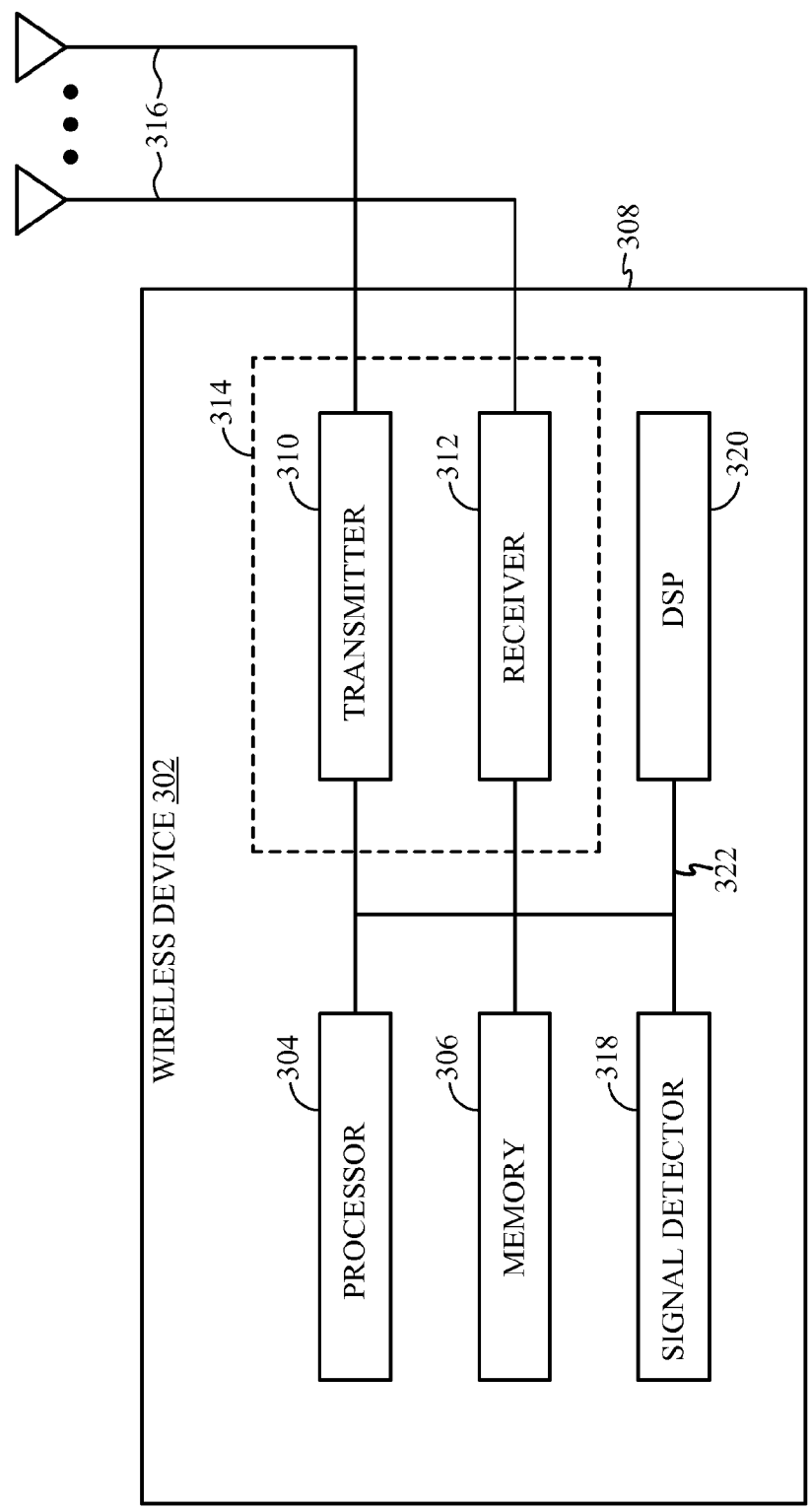
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total enemy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Target Wait Time Flow ID Signaling

In a relay system utilizing low power devices as relays, it may be desirable to allow relays to enter a low power mode (e.g., sleep with one or more components powered down) whenever possible to reduce power consumption. Further, to keep costs down, it may be desirable to use relays with only limited memory. Thus, a relay may be able to buffer only a small amount of data, and may need to forward the data before being able to receive more.

Figure 4:
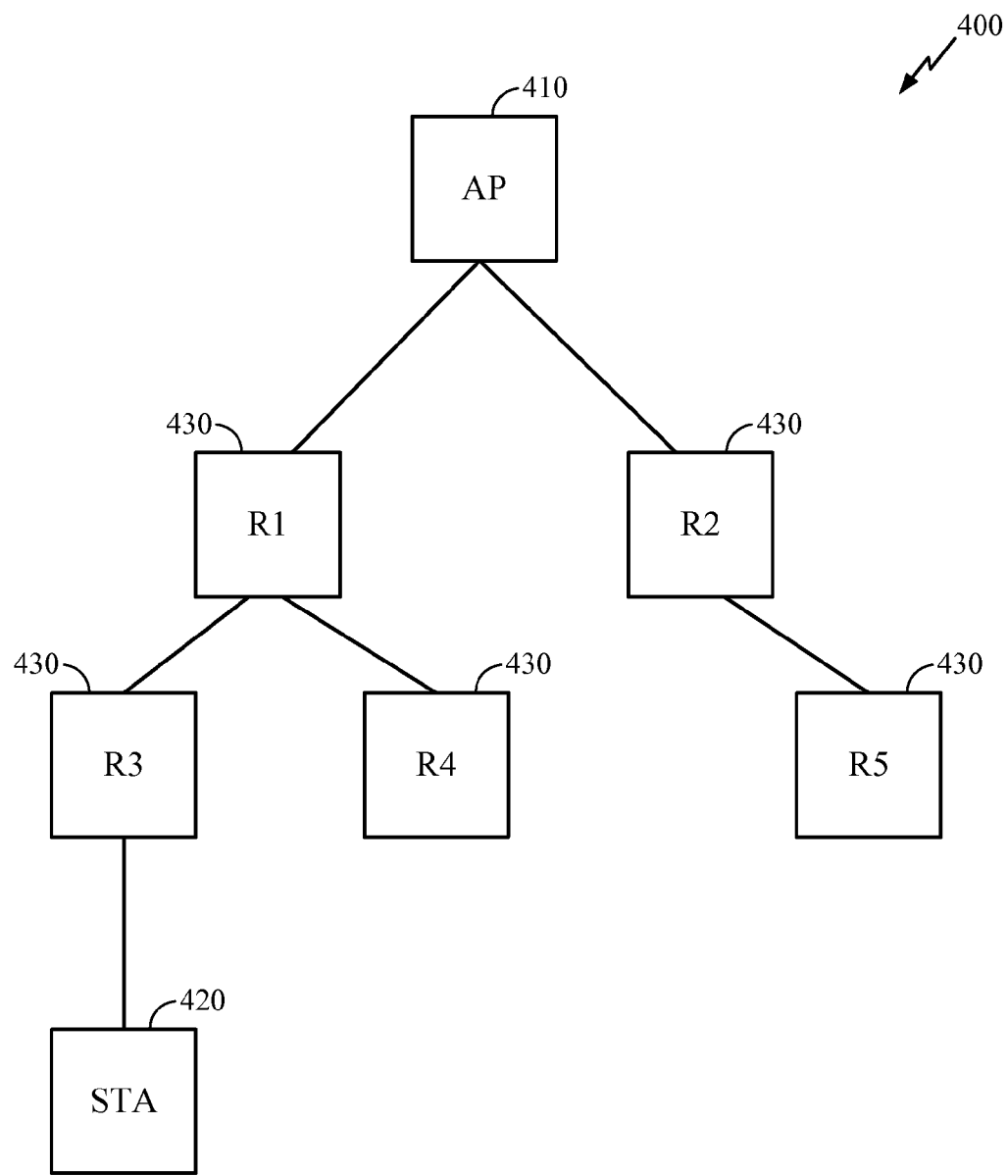
FIG. 4 illustrates an example tree structure of a relay system, in accordance with certain aspects of the present disclosure.

In a multi-hop relay system, such as that shown in FIG. 4, this may present some challenges on how to conserve power—and still ensure devices are awake at appropriate times to relay data. In general, all relays 430 (R1-R5) between an AP 410 and a leaf STA 420 may need to be able to exit a low power state (awaken) quickly, in order to transmit (relay) data in small chunks.

Techniques presented herein may be considered part of a power savings protocol that achieves the above two goals, allowing devices to conserve power and operate with limited amount memory. According to certain aspects, various mechanisms already defined in certain standards (e.g., 802.11 ah), for use in direct communications between an AP and stations, may be modified and extended for use in relay systems.

In various systems, such as IEEE 802.11ah, there may be motivations to utilize relay devices 430 between access points (APs) 410 and stations 420. For example, the use of relays may be desirable because, even with potential increased downlink (DL) range with 900 MHz (or other "sub-1 GHz) carrier, it may not be sufficient in applications with remote sensors or scenarios with obstructions in AP to STA path. On the uplink, a STA may have substantially lower transmit power than an AP, so the STA may not be able to reach the AP.

Key Characteristics of such systems may include the use of a multi-hop relay using a tree structure, as shown in FIG. 4. A relay-node may be formed by any suitable entity, such as a non-AP-STA (e.g., any station that lacks the ability to act—or is not currently acting—as an AP) that connects to a parent node or an AP-STA that allows association by child nodes. Node-to-node security may be ensured, for example, by the configuration of PSK between each pair of nodes. Relay nodes may support 4-address format with backward learning bridge. In some cases, automatic configuration and reconfiguration may be achieved, for example, with a relay node able to attach to a better "parent node," A relay node may, thus, monitor the health of the link to a parent node.

As will be described in greater detail below, a relay node may also be configured to enter a low power state (e.g., a sleep mode with radio components powered down) in order to conserve battery power. In some cases, a relay node may be configured with scheduled wakeup periods, during which the relay node may transmit and receive data. To conserve power, however, rather than exit the low power state each wakeup period, a relay may decide to exit the low power state only when one or more conditions are met (e.g., when there has been an indication there is data for the relay node to transmit or receive).

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Traffic Indication Map

In systems where many stations stay in lower power states much of the time, a traffic indication map (TIM) may be provided to indicate which stations have traffic (and therefore should awake to receive that traffic). A TIM information element (IE) is described in IEEE 802.11 standards, using a bitmap to indicate to any sleeping listening stations if an AP has any buffered frames for it. This TIM IE with the corresponding bitmap is typically sent in on an AP's beacons, with each bit in the bitmap corresponding to the Association Id (AID) of a station. In some cases, an AP may transmit a smaller TIM bitmap, for example, if it expects that only a few number of stations will be asleep. In this case, only a subset of bitmap values may be conveyed in what is referred to as a partial virtual bitmap. Bitmap control and length fields of the TIM information element are used to convey a range of AID values corresponding to the partial virtual bitmap.

Figure 5:
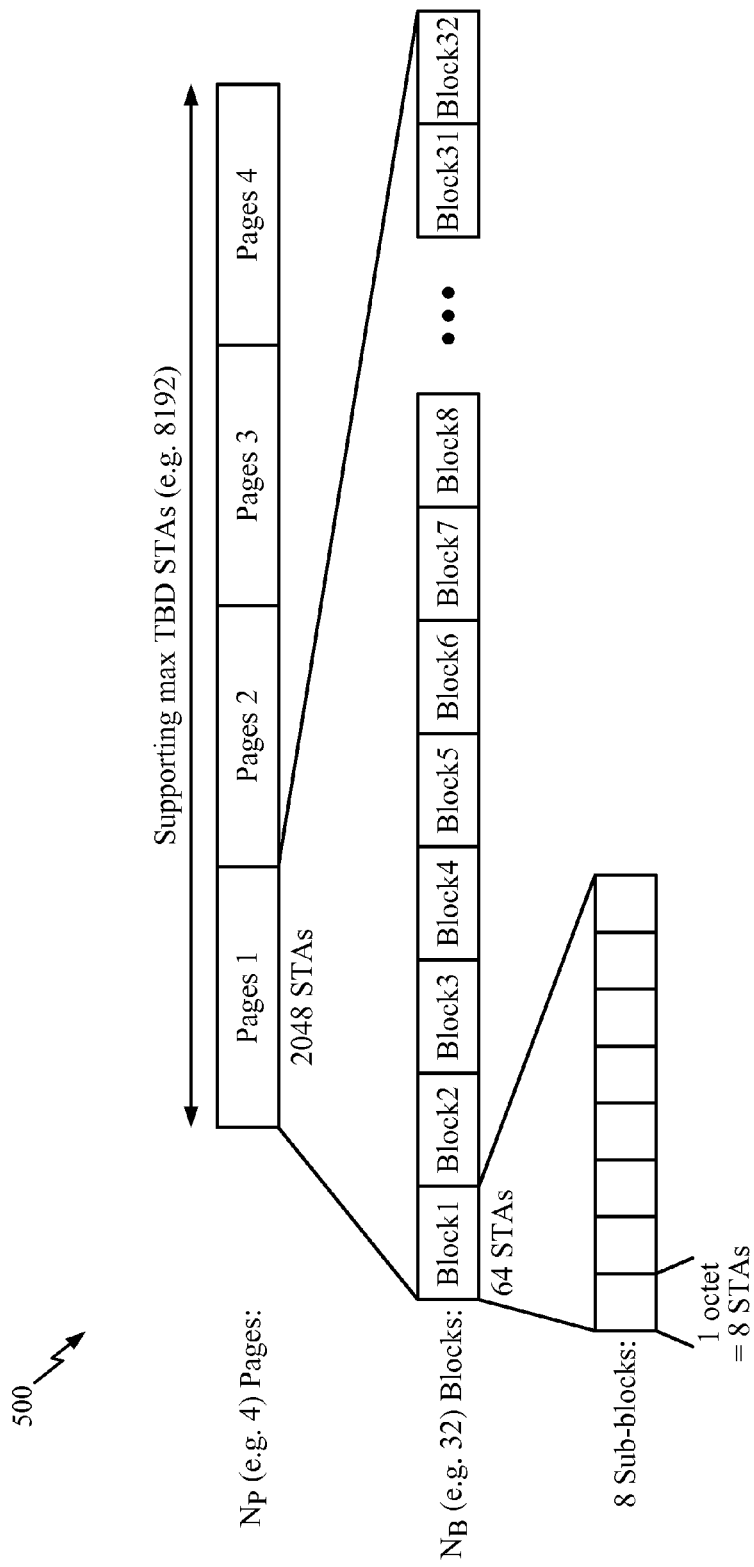
FIG. 5 illustrates an example hierarchical structure of a traffic indication map (TIM), in accordance with certain aspects of the present disclosure.

In some cases, rather than provide a one-to-one mapping between bits and AIDs, a hierarchical approach may be used. For example, as illustrated in the diagram 500 of FIG. 5 the total AID space may be divided into small blocks in a hierarchical manner and only blocks with non-zero values may be transmitted. This approach allows a TIM for a relatively large AID space to be broken into small groups of STAs, which may be easier to maintain. As illustrated, a three level hierarchy may include Pages, blocks within a page, and sub-blocks within a block (e.g., with each sub-block corresponding to 8 individual stations).

FIG. 6A illustrate an example 600A structure of a partial virtual bitmap for such a hierarchical structure, in accordance with certain aspects of the present disclosure. As illustrated, the structure 600A may have variable length encoded block subfields. As illustrated in FIG. 6B, each encoded block subfield 600B may have a block control subfield, block offset subfield, and an encoded block information subfield. As shown in FIG. 6C, the block control subfield 600C may indicate what type of encoding mode is used in the encoded block field, with example encoding types shown in table 600D of FIG. 6D. As illustrated, a single AID encoding mode may be used.

Figure 7:
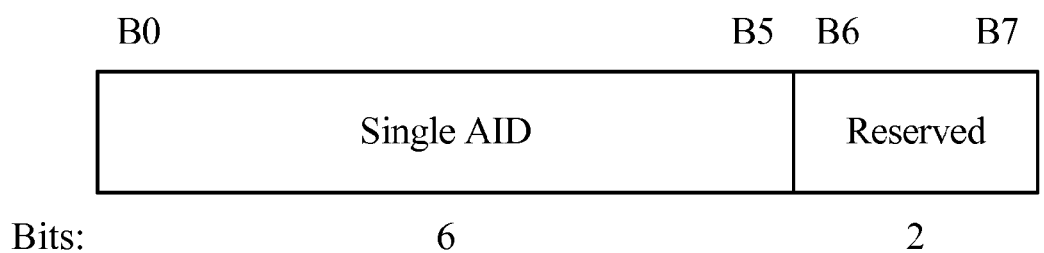
FIG. 7 illustrates an example structure of a partial virtual bitmap for a single association ID (AID) mode, in accordance with certain aspects of the present disclosure.

FIG. 7 illustrates an example structure 700 for encoded block information subfield where the single AID encoding mode is used. As illustrated, in single AID encoding mode, the encoded block information subfield may include a single AID subfield containing 6 bits (e.g., the 6 least significant bits) of an AID indicated in the block and remaining bits may be reserved. The value of the single AID subfield along with other information included in the partial virtual bitmap indicates that there is unicast traffic buffered for a particular station which is identified by its AID. The AID of the station may be obtained by concatenating the Single AID subfield, the Block Offset field, and the Page Index field, in sequence from the least significant bit to the most significant bit.

Traffic Indication Map

As noted above, encoding the partial virtual bitmap that is included in the TIM element may help reduce overhead (relative to a "baseline mechanism" of transmitting a bitmap with bits for an entire AID space). However, due to the re-design that comes as a result of the encoding, the baseline mechanism may not readily allow for the indication of traffic buffered at one or more BSSs while operating in a Multiple BSSID mode.

Aspects of the present disclosure, however, may provide signaling mechanisms to enable a Multiple BSSID mode and other group-cast traffic delivery mechanisms in systems (e.g., 802.11ah systems) by using an encoded Partial Virtual Bitmap field that may be defined for stations capable of supporting such a mode (e.g., sub-1 GHz "S1G" STAs). As used herein, the term group-cast generally refers to traffic addressed to more than one recipient, such as multicast and broadcast traffic. Techniques presented herein may avoid having to re-use an AID space from which AIDs are assigned to non-AP STAs in order to identify multiple BSSs. As described in greater detail below, techniques presented herein may identify these BSSs by using BSS AIDs that are included in Encoded Blocks that may be called Encoded BSS Blocks.

Figure 8:
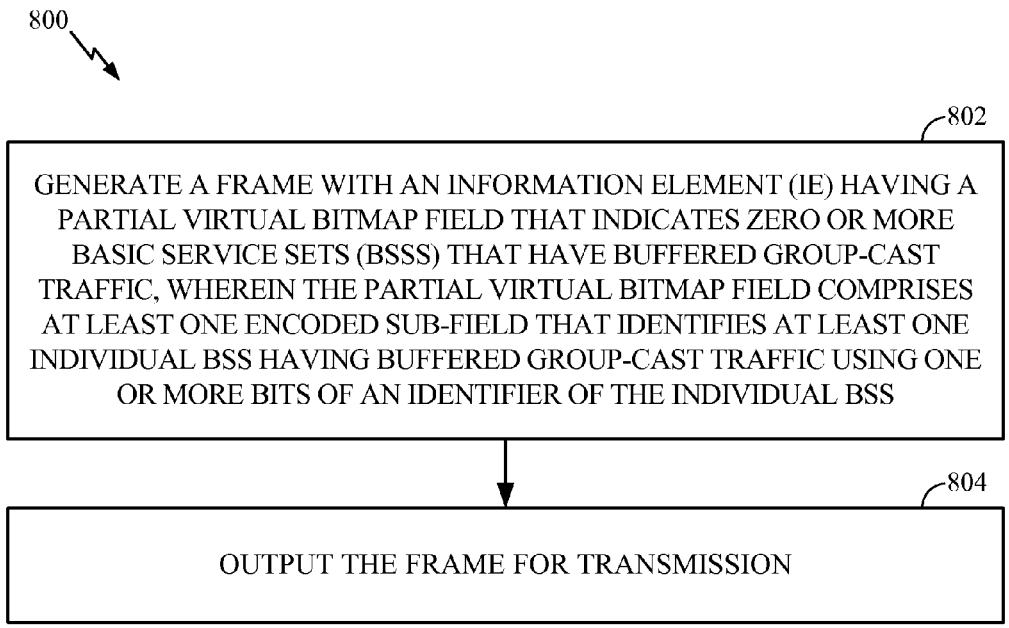
FIG. 8 illustrates a block diagram of example operations for wireless communications, in accordance with certain aspects of the present disclosure.

FIG. 8 illustrates example operations 800 for wireless communications by an apparatus, in accordance with aspects of the present disclosure. The operations 800 may be performed by an apparatus, such as a station, acting as an access point.

Operations 800 may begin at 802, by generating a frame with an information element (IE) having a partial virtual bitmap field that indicates one or more basic service sets (BSSs) that have buffered group-cast traffic, wherein the partial virtual bitmap field comprises at least one encoded subfield that identifies at least one individual BSS having buffered group-cast traffic using an identifier of the individual BSS (e.g., a BSS AID). At 804, the apparatus outputs the frame containing the IE for transmission.

Figure 9:
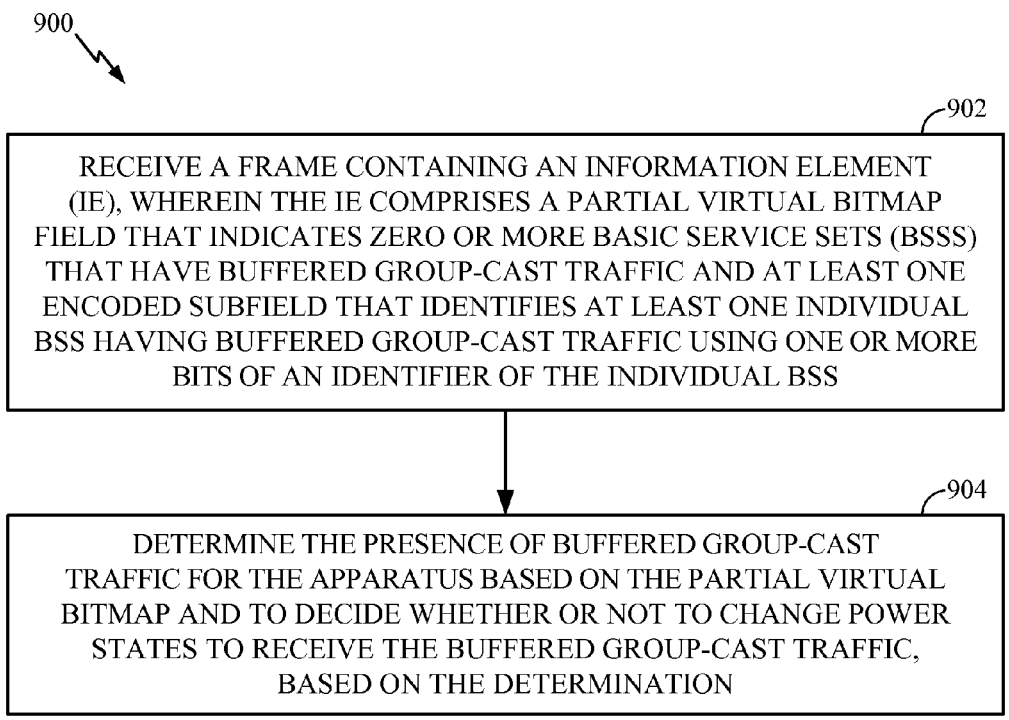
FIG. 9 illustrates a block diagram of example operations for wireless communications, in accordance with certain aspects of the present disclosure.

FIG. 9 is a block diagram of operations 900 for wireless communications by an apparatus, in accordance with aspects of the present disclosure. The operations 900 may be performed by an apparatus, such as a TIM station.

Operations 900 may begin at 902, by receiving a frame containing an information element (IE), wherein the IE comprises a partial virtual bitmap field that indicates zero or more basic service sets (BSSs) that have buffered group-cast traffic and at least one encoded subfield that identifies at least one individual BSS having buffered group-cast traffic using an identifier of the individual BSS. At 904, determine the presence of buffered group-cast traffic for the apparatus based on the partial virtual bitmap and to decide whether or not to change at least one power state to receive the buffered group-cast traffic, based on the determination.

According to certain aspects, the encoded subfield may be an encoded block field and may comprise a Single AID subfield and the TIM IE further comprises a page index field and block offset field that are combinable with the AID subfield to generate the AID of the individual BSS (BSS AID) as described above. The encoded block field comprises an indication (e.g., via the BSS Indicator Bit shown in FIG. 10) of whether the identifier derived from the Single AID subfield indicates buffered group-cast traffic for the individual BSS (i.e., a BSS AID) or the whether it indicates unicast traffic for an individual station whose AID may be constructed using the Single AID subfield. In some cases, generation of the AID of the individual BSS (BSS AID) uses only a subset of one or more bits of the page index field. In such cases, generation of the AID of the individual BSS uses default values, rather than the values of the certain unused bits of the page index field that is included in the TIM element that carries the partial virtual bitmap field.

In some cases, the techniques may be used in systems supporting Multiple BSSID capability, with details of operation determined on a category of stations in the system (e.g., with a first category including non-S1G STAs and a second category including S1G STAs). In some cases, the partial virtual bitmap field may be transmitted in a BSSID Beacon, S1G Beacon or DMG Beacon frame, may indicate the presence or absence of traffic to be delivered to all stations associated to a transmitted or non-transmitted BSSID. For the first category, the first category, the first $2^n$ bits of the bitmap in the Partial Virtual Bitmap field may be reserved for the indication of group addressed frame for the transmitted and all non-transmitted BSSIDs. For the second category, the first zero or more Encoded Blocks in the Partial Virtual Bitmap field may be reserved for the indication of group addressed frame for the transmitted and all non-transmitted BSSIDs. For the first category the AID space may be shared by all BSSs and the lowest AID value assigned to an associated STA may be $2^n$. For cases in the second category, the lowest AID assigned to an associated STA may be 1. In either case the Encoded Blocks that contain BSS AIDs may be the first blocks, preceding the Partial Virtual Bitmap field. Note that in the cases of the first category any encoding method can be applied to the partial virtual bitmap. In these cases the same principle of ignoring the page index value for the purpose of obtaining the BSS AID is still valid.

In some cases, when Multiple BSSID capability is not enabled (e.g., dot11MultiBSSIDActivated is false and dot11S1GoptionImplemented is false), the Partial Virtual Bitmap field consists of octets numbered N1 to N2 of the traffic indication virtual bitmap, where N1 is the largest even number such that bits numbered 1 to (N1×8)−1 in the traffic indication virtual bitmap may be all 0 and N2 may be the smallest number such that bits numbered (N2+1)×8 to 2007 in the virtual bitmap are all 0. In this case, the Bitmap Offset subfield value may contain the number N1/2, and the Length field is set to (N2−N1)+4.

In some cases, when Multiple BSSID capability is not enabled (e.g., dot11MultiBSSIDActivated is true), the non-S1G Partial Virtual Bitmap field of the TIM element may be constructed as follows, where the maximum possible number of BSSIDs is an integer power of 2, n=log 2 (maximum possible number of BSSIDs), k is the number of actually supported nontransmitted BSSIDs, and k<=($2^n$−1). In these cases, the maximum size of the non-S1G Partial Virtual Bitmap field of the TIM element is $2^n$−1.

For a non-S1G BSS, the bits 1 to k of the bitmap may be used to indicate that one or more group addressed frames are buffered for each AP corresponding to a nontransmitted BSSID. The AIDS from 1 to k are not allocated to a non-S1G STA. In a non-S1G BSS, the AIDs from (k+1) to ($2^n$−1) may be reserved and set to 0. The remaining AIDs may be shared by the non-S1G BSSs corresponding to the transmitted BSSID and all nontransmitted BSSIDs. In an S1G BSS, these bits, 1 to k, may be included in BSS Encoded Blocks and are identified as BSS AIDs. In this case, the BSS AIDs may not form part of the AID space from which AIDs are assigned to non-AP STAs. The AID space may be shared by the S1G BSSs corresponding to the transmitted BSSID and all nontransmitted BSSIDs.

When the DTIM Count field is 0 for a BSS that has a nontransmitted BSSID, and one or more group addressed frames are buffered at the AP for this BSS, and the corresponding bits from bit 1 to bit k may be set to 1.

Each bit starting from bit $2^n$ in the non-S1G traffic-indication virtual bitmap and starting from bit 1 in the S1G traffic-indication virtual bitmap may correspond to individually addressed traffic buffered for a specific STA within any BSS corresponding to a transmitted or nontransmitted BSSID at the time the Beacon frame is transmitted. The correspondence may be based on the AID of the STA.

Based upon an AP's knowledge of the capability of associated stations to support the multiple BSSID capability, as indicated by the corresponding field in the Extended Capabilities element and the content of the traffic indication virtual bitmap, the AP may encode the Partial Virtual Bitmap and the Bitmap Control field of the TIM element using one of the three following methods, with the particular operations depending on the category of stations in the system.

For example, for a system with a first category of stations (e.g., non-S1G), an AP may use one method (referred to as Method B described below) when it determines that the bit for each associated non-AP STA in the traffic indication virtual bitmap, when correctly set, can be reconstructed by each non-AP STA from the received TIM element. Otherwise, the AP may use a second method (referred to Method A described below), while an AP in a system with a second category of stations (e.g., S1G) may use a third method (referred to as Method C described below).

According to Method A, the Partial Virtual Bitmap field pray consist of octets numbered 0 to N2 of the traffic indication virtual bitmap, where N2 is the smallest number such that bits numbered (N2+1)×8 to 2007 in the traffic indication virtual bitmap (#234) are all 0. If such a value N2 does not exist, that is, when not all bits in the last octet of the traffic indication virtual bitmap are equal to 0, N2=250. When using this method, the Bitmap Offset subfield value may contains the number 0, and the Length field is N2+4.

According to Method B, the Partial Virtual Bitmap field may consist of a concatenation of octets numbered 0 to N0−1 and octets numbered N1 to N2 of the traffic indication virtual bitmap, where N0 is the smallest positive integer such that N0×8−2n<8. If N0 is an odd number, then N1 is the largest odd number such that N0<N1 and each of the bits N0×8 to (N1×8−1) is equal to 0. When N0 is an even number, N1 is the largest even number such that N0<N1 and each of the bits N0×8 to (N1×8−1) is equal to 0. If such a value N1>N0 does not exist, N1=N0. Additionally, N2 is the smallest integer value for which the values for bit (N2+1)×8 to 2007 in the traffic indication virtual bitmap (#234) are all 0. If such a value N2 does not exist, that is, when not all bits in the last octet of the traffic indication virtual bitmap are equal to 0, N2=250. When using this method, the Bitmap Offset subfield contains the value of (N1−N0)/2, and the Length field is N0+N2−N1+4.

According to aspects of the present disclosure, according to Method C, the Partial Virtual Bitmap field may consist of a concatenation of Encoded Block subfields that contain BSS AIDs and Encoded Block subfields that contain AIDs.

For both Method A and Method B, when there are no frames buffered for any BSS corresponding to a transmitted or nontransmitted BSSID supported, the Partial Virtual Bitmap field may be encoded as a single octet equal to 0, the Bitmap Offset subfield is 0, and the Length field is 4. When there are no buffered individually addressed frames for any BSS corresponding to a transmitted or nontransmitted BSSID, but there are buffered group addressed frames for one or more of the BSSs, the non-S1G Partial Virtual Bitmap field consists of the octets number 0 to N0−1 where N0 is the smallest positive integer such that (N0×8−2n<8), while the S1G Partial Virtual Bitmap field contains the one or more Encoded Blocks that contain BSS AIDs. In this case, the Bitmap Offset subfield value may contain the number 0, and the Length field may be N0+3.

In some cases, in S1G scenarios (e.g., when dot11S1GOptionImplemented is true), the Partial Virtual Bitmap field may be constructed with one or more Encoded Block subfields if at least one bit in the traffic indication virtual bitmap that is encoded with that particular encoding method is equal to 1. In this case, the Encoded Block subfield may consist of the Block Control subfield, the Block Offset subfield, and the Encoded Block Information subfield. When multiple BSSID is enabled (e.g., dot11MultipleBSSIDActivated is true), the Partial Virtual Bitmap field contains zero or more BSS Encoded Block subfields. The Encoding Mode subfield may indicates one of the four encoding modes: the Block Bitmap mode, the Single AID mode, the OLB (Offset, Length, Bitmap) mode, and the ADE (AID Differential Encode) mode. An Encoded Block is encoded with Single AID mode and includes a BSS AID (i.e., the BSS Indicator subfield of its Encoded Block Information subfield is equal to 1). An Encoded Block with Single AID mode that is not an Encoded BSS Block has the BSS Indicator subfield of its Subblock equal to 0. Other methods can be used as well, as indicated above.

As illustrated in FIG. 10, the Encoded Block Information subfield 1000 may consist of the Single AID subfield. As an example, the Single AID subfield may be 6 bits in length and contains the 6 LSBs of the single AID in the Block. The BSS Indicator may be act to 1 if the Single AID identifies a BSS AID. Otherwise, it may be set to 0. The rest of the bits of the Encoded Block Information subfield may be reserved. If the BSS Indicator field is 0, the value in the Single AID subfield may indicate traffic buffered for the STA whose AID is N, where N may be constructed by concatenating the Single AID subfield/N[0:5]), the Block Offset field (N[6:10]), and the Page Index field (N[11:12]) in sequence from LSB to MSB. If the BSS Indicator field is 1, the value in the Single AID subfield indicates that one or more group addressed are buffered at the AP for the BSS which BSS AID is N, where N may be constructed as described above but with the value of the Page Index field (N[11:12]) equal to 0 (i.e., the BSS AID does not depend on the value of the Page Index field in the Bitmap Control field).

If the BSS Indicator field is 0, the value in the Single AID subfield may indicate traffic buffered for the STA whose AID is N, where N is constructed by concatenating the Single AID subfield (N[0:5]), the Block Offset field (N[6:10]), and the Page Index field (N[11:12]) in sequence from LSB to MSB. If the BSS Indicator field is 1, the value in the Single AID subfield may indicate that one or more types of group addressed traffic is buffered at the AP for the BSS which BSS AID is N, where the value of the Page Index field (N[11:12]) may be assumed to be a default value (e.g., a default value of 0 may be assumed for either or both of these bits regardless of the Page Index field value in the Bitmap Control field of the TIM element).

Figure 8A:
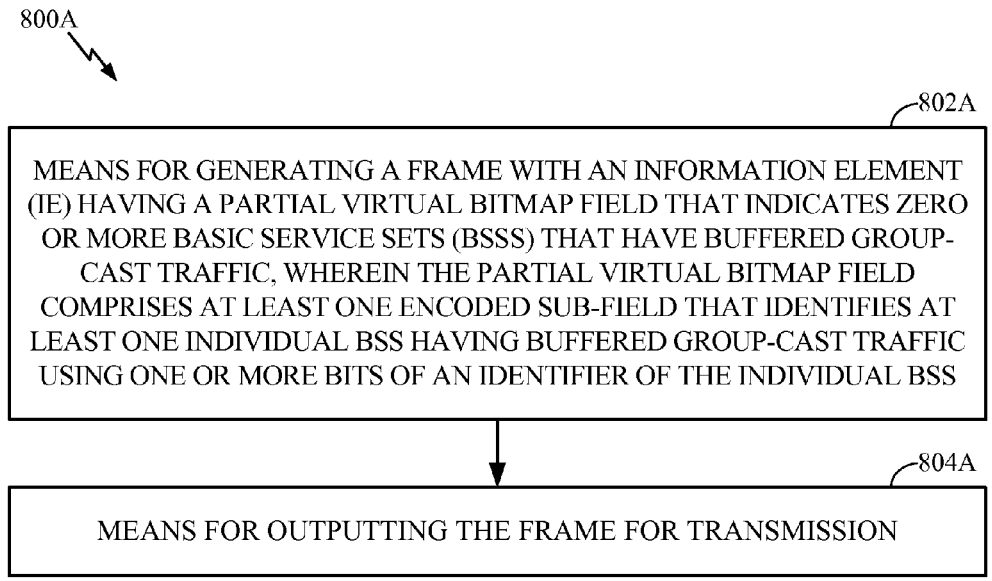
FIG. 8A illustrates example means capable of performing the operations shown in FIG. 8.
Figure 9A:
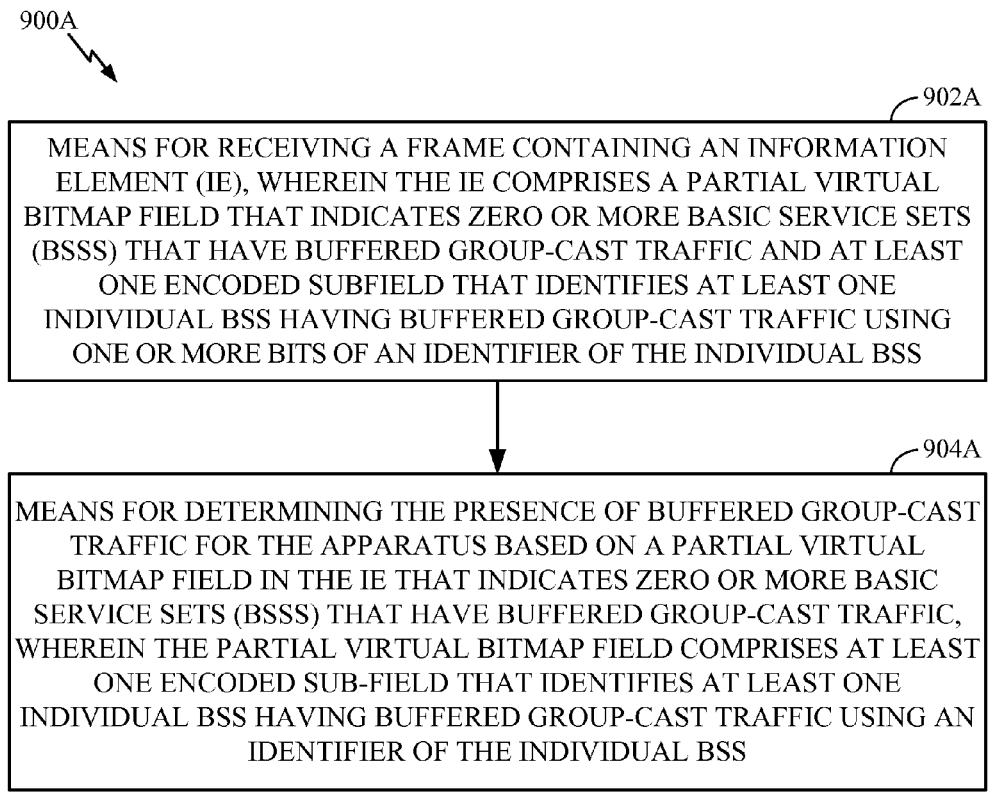
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 and 900 illustrated in FIGS. 8 and 9 correspond to means 800A and 900A illustrated in FIGS. 8A and 9A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, means for generating, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for identifying wakeup periods may be implemented by a processing system performing an algorithm that identifies wakeup periods based on a configuration (e.g., via an IE), means for determining whether to enable radio functions during wakeup periods may be implemented by a (same or different) processing system performing an algorithm that takes, as input, the wakeup periods and whether the presence of data has been indicated, while means for enabling radio functions may be implemented a (same or different) processing system performing an algorithm that takes, as input, the decision from means for determining and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory. EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame with an information element (IE) comprising a page index field, a block offset field, and a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, wherein the at least one encoded subfield comprises a single association identifier subfield or a single assigned identifier (AID) subfield, and wherein the processing system is configured to use the page index field and the block offset field with the single association identifier subfield or the single AID subfield to generate the identifier of the individual BSS; and an interface for outputting the frame comprising the IE for transmission.

2. The apparatus of claim 1, wherein the identifier of the individual BSS comprises an association identifier or an AID.

3. The apparatus of claim 1, wherein the processing system is further configured to assume one or more most significant bits of the identifier of the individual BSS have at least one default value rather than an actual value of one or more bits of the page index field included in the IE.

4. The apparatus of claim 1, wherein the processing system is further configured to assume a default value of 0 for at least two most significant bits of the identifier of the individual BSS rather than an actual value of the page index field included in the IE.

5. The apparatus of claim 1, wherein the at least one encoded subfield comprises an indication of whether:
an AID value associated with the single association identifier subfield or single AID subfield indicates buffered group-cast traffic for the individual BSS; or
an AID value associated with the single association identifier subfield or single AID subfield indicates unicast traffic for a device.

6. The apparatus of claim 1, wherein the at least one encoded subfield precedes an association identifier or an AID of a device.

7. A method for wireless communications by an apparatus, comprising:
generating, at the apparatus, a frame with an information element (IE) comprising a page index field, a block offset field, and a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, wherein the at least one encoded subfield comprises a single association identifier subfield or a single assigned identifier (AID) subfield, and wherein the page index field and the block offset field are used with the single association identifier subfield or the single AID subfield to generate the identifier of the individual BSS; and
outputting the frame comprising the IE for transmission.

8. The method of claim 7, wherein the identifier of the individual BSS comprises an association identifier or an AID.

9. The method of claim 7, wherein the generating comprises assuming one or more most significant bits of the identifier of the individual BSS have at least one default value rather than an actual value of one or more bits of the page index field included in the IE.

10. The method of claim 7, wherein the generating comprises assuming a default value of 0 for at least two most significant bits of the identifier of the individual BSS rather than an actual value of the page index field included in the IE.

11. The method of claim 7, wherein the at least one encoded subfield comprises an indication of whether:
an AID value associated with the single association identifier subfield or single AID subfield indicates buffered group-cast traffic for the individual BSS; or
an AID value associated with the single association identifier subfield single AID subfield indicates unicast traffic for a device.

12. The method of claim 7, wherein the at least one encoded subfield precedes an association identifier or an AID of a device.

13. An apparatus for wireless communications, comprising:
means for generating a frame with an information element (IE) comprising a page index field, a block offset field, and a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, wherein the at least one encoded subfield comprises a single association identifier subfield or a single assigned identifier (AID) subfield, and wherein the means for generating uses the page index field and the block offset field with the single association identifier subfield or the single AID subfield to generate the identifier of the individual BSS; and
means for outputting the frame comprising the IE for transmission.

14. The apparatus of claim 13, wherein the identifier of the individual BSS comprises an association identifier or an AID.

15. The apparatus of claim 13, wherein the means for generating assumes one or more most significant bits of the identifier of the individual BSS have at least one default value rather than an actual value of one or more bits of the page index field included in the IE.

16. The apparatus of claim 13, wherein the means for generating assumes a default value of 0 for at least two most significant bits of the individual BSS rather than an actual value of the page index field included in the IE.

17. The apparatus of claim 13, wherein the at least one encoded subfield comprises an indication of whether:
an AID value associated with the single association identifier subfield or the single AID subfield indicates buffered group-cast traffic for the individual BSS; or
an AID value associated with the single association identifier subfield or the single AID subfield indicates unicast traffic for a device.

18. The apparatus of claim 13, wherein the at least one encoded subfield precedes an association identifier or an AID of a device.

19. A non-transitory computer-readable medium for wireless communications by an apparatus, the non-transitory computer-readable medium having instructions for:
generating a frame with a information element (IE) comprising a page index field, a block offset field, and a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, wherein the at least one encoded subfield comprises a single association identifier subfield or a single assigned identifier (AID) subfield, and wherein the page index field and the block offset field are used with the single association identifier subfield or the single AID subfield to generate the identifier of the individual BSS; and outputting the frame comprising the IE for transmission.

20. An access point, comprising:

a processing system configured to generate a frame with an information element (IE) comprising a page index field, a block offset field, and a partial virtual bitmap field that indicates zero or more basic service sets (BSSs) that have buffered group-cast traffic, wherein the partial virtual bitmap field comprises at least one encoded subfield that identifies at least one individual BSS having buffered group-cast traffic using one or more bits of an identifier of the individual BSS, wherein the at least one encoded subfield comprises a single association identifier subfield or a single assigned identifier (AID) subfield, and wherein the processing system is configured to use the page index field and the block offset field with the single association identifier subfield or the single AID subfield to generate the identifier of the individual BSS; and a transmitter configured to transmit the frame comprising the IE for transmission.

* * * * *